United States Patent
Liu et al.

(10) Patent No.: US 10,499,396 B2
(45) Date of Patent: Dec. 3, 2019

(54) RESOURCE REQUEST METHOD AND DEVICE

(71) Applicant: HUAWEI TECHNOLOGIES CO., LTD., Shenzhen, Guangdong (CN)

(72) Inventors: Huiping Liu, Shanghai (CN); Lingli Pang, Shanghai (CN); Xiaoxiao Zheng, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/951,886

(22) Filed: Apr. 12, 2018

(65) Prior Publication Data
US 2018/0234975 A1    Aug. 16, 2018

Related U.S. Application Data

(63) Continuation of application No. PCT/CN2015/091786, filed on Oct. 12, 2015.

(51) Int. Cl.
*H04W 72/04* (2009.01)
*H04W 72/12* (2009.01)
*H04W 28/02* (2009.01)

(52) U.S. Cl.
CPC ... *H04W 72/0453* (2013.01); *H04W 28/0278* (2013.01); *H04W 72/0413* (2013.01);
(Continued)

(58) Field of Classification Search
CPC ......... H04W 72/0453; H04W 72/0413; H04W 28/0278; H04W 72/1284; H04W 72/0493
See application file for complete search history.

(56) References Cited

U.S. PATENT DOCUMENTS

2009/0052388 A1*  2/2009  Kim ............... H04W 74/002
                                                     370/329
2010/0077100 A1   3/2010  Hsu et al.
(Continued)

FOREIGN PATENT DOCUMENTS

CN    101132220 A    2/2008
CN    101426231 A    5/2009
(Continued)

OTHER PUBLICATIONS

3GPP TS 36.321 V12.7.0 (Sep. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.

*Primary Examiner* — Chi Ho A Lee
(74) *Attorney, Agent, or Firm* — Womble Bond Dickinson (US) LLP

(57) ABSTRACT

Embodiments of the present disclosure describe a resource request method and a device, to implement a low-delay resource request and then ensure low-delay data transmission of UE, so as to improve a user experience. An embodiment of the resource request method may include receiving, by UE, service data. The method may also include when the service data is received or when a size of preset data satisfies a preset sending condition, sending a resource request indication to a network side device, where the resource request indication is used to instruct the network side device to allocate, to the UE, a resource for sending the service data.

18 Claims, 3 Drawing Sheets

(52) U.S. Cl.
CPC ... *H04W 72/0493* (2013.01); *H04W 72/1284* (2013.01); *H04W 72/1289* (2013.01)

(56) References Cited

U.S. PATENT DOCUMENTS

| | | |
|---|---|---|
| 2011/0026467 A1 | 2/2011 | Wen et al. |
| 2011/0242972 A1 | 10/2011 | Sebire et al. |
| 2012/0207124 A1* | 8/2012 | Liu .................. H04W 72/1231 370/329 |
| 2012/0314672 A1* | 12/2012 | Chen .................. H04W 74/002 370/329 |
| 2013/0107722 A1* | 5/2013 | Huang .................. H04W 28/12 370/241 |
| 2013/0150007 A1* | 6/2013 | Wang .................... H04W 4/18 455/414.1 |
| 2014/0112306 A1* | 4/2014 | Zhou .................... H04W 72/10 370/331 |
| 2014/0161083 A1* | 6/2014 | Nobukiyo ........... H04W 72/042 370/329 |
| 2015/0146778 A1* | 5/2015 | De Cicco ............. H04N 19/149 375/240.07 |
| 2015/0156793 A1* | 6/2015 | Dai .................... H04W 72/1242 370/329 |
| 2015/0223097 A1 | 8/2015 | Hsu |
| 2016/0100397 A1 | 4/2016 | Wen et al. |
| 2016/0255537 A1* | 9/2016 | Uchino ............. H04W 72/1284 370/329 |
| 2018/0084542 A1* | 3/2018 | Fujishiro ............... H04L 1/0026 |
| 2018/0213549 A1* | 7/2018 | Kim .................... H04W 72/087 |

FOREIGN PATENT DOCUMENTS

| | | |
|---|---|---|
| CN | 101686499 A | 3/2010 |
| CN | 101729394 A | 6/2010 |
| CN | 103369509 A | 10/2013 |
| CN | 104144512 A | 11/2014 |
| EP | 2661138 A1 | 11/2013 |
| WO | 2013108178 A1 | 7/2013 |

* cited by examiner

RESOURCE REQUEST METHOD AND DEVICE

CROSS-REFERENCE TO RELATED APPLICATIONS

This application is a continuation of International Application No. PCT/CN2015/091786, filed on Oct. 12, 2015, the disclosure of which is hereby incorporated by reference in its entirety.

TECHNICAL FIELD

The present disclosure relates to the communications field, and in particular, to a resource request method and a device.

BACKGROUND

In an evolved universal terrestrial radio access network (E-UTRAN), user equipment (UE) requests a resource from a network side device, and performs uplink data transmission by using a time frequency resource designated by the network side device.

The UE requests a resource from the network side device in the following manner: The UE reports, to the network side device, a buffer status report (BSR) used to reflect an amount of data to be transmitted by the UE. The network side device designates, for the UE according to the BSR reported by the UE, a time frequency resource used for uplink data transmission.

Currently, UE triggers, by using a trigger mechanism, reporting a BSR to request a network side device to allocate a resource. Specifically, when data on a logical channel with a higher priority for the UE enters a buffering queue of the UE, when an uplink data buffer of the UE is empty and new data is coming, or when a retransmission BSR timer (retx-BSR-Timer) expires and data on a logical channel needs to be sent, the UE sends a regular BSR to the network side device. After the UE already allocates an uplink resource, when a size of a padding part is sufficient to accommodate BSR reporting information, the UE sends a padding BSR to the network side device. When a periodic BSR timer (periodicBSR-Timer) expires, the UE sends a periodic BSR to the network side device.

With evolution of wireless communications technologies, many services have a relatively high delay requirement. If the foregoing resource request manner continues to be used, and a BSR sending condition defined by a trigger mechanism is not satisfied when the UE receives service data that has a high delay requirement, the UE cannot obtain an appropriate time frequency resource for sending the service data. Consequently, a data transmission delay is increased, and user experience is degraded.

SUMMARY

The present disclosure provides a resource request method and a device, to implement a low-delay resource request and then ensure low-delay data transmission of UE, so as to improve user experience.

To achieve the foregoing objective, the following technical solutions are used in embodiments of the present disclosure:

A first aspect provides a resource request method, applied to UE, where the method includes:

receiving service data; and when the service data is received or when a size of preset data satisfies a preset sending condition, sending a resource request indication to a network side device, where the resource request indication is used to instruct the network side device to allocate, to the UE, a resource for sending the service data, where the preset data is the received service data, to-be-transmitted data in a buffer corresponding to a logical channel on which the received service data is located, or all to-be-transmitted data in a buffer of the UE after the service data is received.

With reference to the first aspect, in a first possible embodiment of the first aspect, the resource request indication is a buffer status report (BSR), where the BSR includes an indication of the size of the preset data.

With reference to the first aspect, in a second possible embodiment of the first aspect, the resource request indication is an indication of a buffer level, and the buffer level is a preset range of the size of the preset data.

With reference to the first aspect, the first possible embodiment of the first aspect, or the second possible embodiment of the first aspect, in a third possible embodiment of the first aspect, the sending a resource request indication to a network side device includes:

sending a scheduling request (SR) including the resource request indication to the network side device;

sending the resource request indication to the network side device by using a dedicated time frequency resource on a physical uplink control channel (PUCCH); or sending an uplink media access control (MAC) packet header including the resource request to the network side device.

With reference to any one of the first aspect, or the first possible embodiment of the first aspect to the third possible embodiment of the first aspect, in a fourth possible embodiment of the first aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the first aspect, in a fifth possible embodiment of the first aspect, after the receiving service data, the method further includes:

receiving the preset threshold or the preset level sent by the network side device.

A second aspect provides a resource request method, applied to a network side device, where the method includes:

receiving a resource request indication sent by UE, where the resource request indication is sent by the UE when the UE receives service data or sent by the UE when preset data satisfies a preset sending condition; and the preset data is the received service data, to-be-transmitted data in a buffer corresponding to a logical channel on which the received service data is located, or all to-be-transmitted data in a buffer of the UE after the service data is received; and allocating a resource to the UE according to the resource request indication.

With reference to the second aspect, in a first possible embodiment of the second aspect, the resource request indication is a BSR, where the BSR includes an indication of the size of the preset data.

With reference to the second aspect, in a second possible embodiment of the second aspect, the resource request indication is an indication of a buffer level, and the buffer level is a preset range of the size of the preset data.

With reference to the second aspect, the first possible embodiment of the second aspect, or the second possible embodiment of the second aspect, in a third possible embodiment of the second aspect, the receiving a resource request indication sent by UE includes:

receiving a scheduling request (SR) that includes the resource request indication and that is sent by the UE;

receiving, by using a dedicated time frequency resource on a PUCCH, the resource request indication sent by the UE; or receiving an uplink MAC packet header that includes the resource request indication and that is sent by the UE.

With reference to any one of the second aspect, or the first possible embodiment of the second aspect to the third possible embodiment of the second aspect, in a fourth possible embodiment of the second aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the second aspect, in a fifth possible embodiment of the second aspect, before the receiving a resource request indication sent by user equipment (UE), the method further includes:

sending the preset threshold or the preset level to the UE.

A third aspect provides UE, including:

a receiving unit, configured to receive service data; and a sending unit, configured to: when the service data is received or when a size of preset data satisfies a preset sending condition, send a resource request indication to a network side device, where the resource request indication is used to instruct the network side device to allocate, to the UE, a resource for sending the service data, where the preset data is the received service data, to-be-transmitted data in a buffer corresponding to a logical channel on which the received service data is located, or all to-be-transmitted data in a buffer of the UE after the service data is received.

With reference to the third aspect, in a first possible embodiment of the third aspect, the resource request indication is a BSR, where the BSR includes an indication of the size of the preset data.

With reference to the third aspect, in a second possible embodiment of the third aspect, the resource request indication is an indication of a buffer level, and the buffer level is a preset range of the size of the preset data.

With reference to the third aspect, the first possible embodiment of the third aspect, or the second possible embodiment of the third aspect, in a third possible embodiment of the third aspect, the sending unit is configured to:

send an SR including the resource request indication to the network side device;

send the resource request indication to the network side device by using a dedicated time frequency resource on a PUCCH; or send an uplink MAC packet header including the resource request to the network side device.

With reference to any one of the third aspect, or the first possible embodiment of the third aspect to the third possible embodiment of the third aspect, in a fourth possible embodiment of the third aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the third aspect, in a fifth possible embodiment of the third aspect, the receiving unit is further configured to:

receive the preset threshold or the preset level sent by the network side device.

A fourth aspect provides a network side device, including:

a receiving unit, configured to receive a resource request indication sent by UE, where the resource request indication is sent by the UE when the UE receives service data or sent by the UE when preset data satisfies a preset sending condition; and the preset data is the received service data, to-be-transmitted data in a buffer corresponding to a logical channel on which the received service data is located, or all to-be-transmitted data in a buffer of the UE after the service data is received; and an allocation unit, configured to allocate a resource to the UE according to the resource request indication received by the receiving unit.

With reference to the fourth aspect, in a first possible embodiment of the fourth aspect, the resource request indication is a buffer status report (BSR), where the BSR includes an indication of the size of the preset data.

With reference to the fourth aspect, in a second possible embodiment of the fourth aspect, the resource request indication is an indication of a buffer level, and the buffer level is a preset range of the size of the preset data.

With reference to the fourth aspect, the first possible embodiment of the fourth aspect, or the second possible embodiment of the fourth aspect, in a third possible embodiment of the fourth aspect, the receiving unit is configured to:

receive an SR that includes the resource request indication and that is sent by the UE;

receive, by using a dedicated time frequency resource on a PUCCH, the resource request indication sent by the UE; or receive an uplink MAC packet header that includes the resource request indication and that is sent by the UE.

With reference to any one of the fourth aspect, or the first possible embodiment of the fourth aspect to the third possible embodiment of the fourth aspect, in a fourth possible embodiment of the fourth aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the fourth aspect, in a fifth possible embodiment of the fourth aspect, the network side device further includes:

a sending unit, configured to send the preset threshold or the preset level to the UE.

A fifth aspect provides UE, including:

a receiver, configured to receive service data; and a processor, configured to: when the service data is received or when a size of preset data satisfies a preset sending condition, send a resource request indication to a network side device by using a transmitter, where the resource request indication is used to instruct the network side device to allocate, to the UE, a resource for sending the service data, where the preset data is the received service data, to-be-transmitted data in a buffer corresponding to a logical channel on which the received service data is located, or all to-be-transmitted data in a buffer of the UE after the service data is received.

With reference to the fifth aspect, in a first possible embodiment of the fifth aspect, the resource request indication is a BSR, where the BSR includes an indication of the size of the preset data.

With reference to the fifth aspect, in a second possible embodiment of the fifth aspect, the resource request indication is an indication of a buffer level, and the buffer level is a preset range of the size of the preset data.

With reference to the fifth aspect, the first possible embodiment of the fifth aspect, or the second possible embodiment of the fifth aspect, in a third possible embodiment of the fifth aspect, the processor is configured to:

send an SR including the resource request indication to the network side device by using the transmitter;

send the resource request indication to the network side device by using a dedicated time frequency resource on a PUCCH and by using the transmitter; or send an uplink MAC packet header including the resource request to the network side device by using the transmitter.

With reference to any one of the fifth aspect, or the first possible embodiment of the fifth aspect to the third possible embodiment of the fifth aspect, in a fourth possible embodiment of the fifth aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the fifth aspect, in a fifth possible embodiment of the fifth aspect, the receiver is further configured to:

receive the preset threshold or the preset level sent by the network side device.

A sixth aspect provides a network side device, including:

a receiver, configured to receive a resource request indication sent by UE, where the resource request indication is sent by the UE when the UE receives service data or sent by the UE when preset data satisfies a preset sending condition; and the preset data is the received service data, to-be-transmitted data in a buffer corresponding to a logical channel on which the received service data is located, or all to-be-transmitted data in a buffer of the UE after the service data is received; and a processor, configured to allocate a resource to the UE according to the resource request indication received by the receiver.

With reference to the sixth aspect, in a first possible embodiment of the sixth aspect, the resource request indication is a BSR, where the BSR includes an indication of the size of the preset data.

With reference to the sixth aspect, in a second possible embodiment of the sixth aspect, the resource request indication is an indication of a buffer level, and the buffer level is a preset range of the size of the preset data.

With reference to the sixth aspect, the first possible embodiment of the sixth aspect, or the second possible embodiment of the sixth aspect, in a third possible embodiment of the sixth aspect, the receiver is configured to:

receive an SR that includes the resource request indication and that is sent by the UE;

receive, by using a dedicated time frequency resource on a PUCCH, the resource request indication sent by the UE; or receiving an uplink MAC packet header that includes the resource request indication and that is sent by the UE.

With reference to any one of the sixth aspect, or the first possible embodiment of the sixth aspect to the third possible embodiment of the sixth aspect, in a fourth possible embodiment of the sixth aspect, the preset sending condition comprises the size of the preset data reaching a preset threshold; or the preset sending condition comprises the buffer level reaching a preset level, where the buffer level is a preset range of the size of the preset data.

With reference to the fourth possible embodiment of the sixth aspect, in a fifth possible embodiment of the sixth aspect, the network side device further includes:

a transmitter, configured to send the preset threshold or the preset level to the UE.

According to the resource request method and the device that are provided in the embodiments of the present disclosure, the UE receives the service data, and when the service data is received or when the size of the preset data satisfies the preset sending condition, the UE sends the resource request indication to the network side device, where the resource request indication is used to instruct the network side device to allocate, to the UE, the resource for sending the received service data.

On one hand, when receiving the service data, the UE requests a resource from the network side device by sending the resource request indication. Therefore, according to the solutions of the embodiments of the present disclosure, the resource for sending the service data is requested in time, thereby reducing a delay.

On the other hand, when the size of the preset data satisfies the preset sending condition, a resource is requested from the network side device by sending the resource request indication, and a resource request delay may be controlled by setting content of the preset sending condition. Therefore, according to the solutions of the embodiments of the present disclosure, a time of requesting the resource for sending the service data may be controlled, and then the delay is reduced.

To sum up, according to the resource request method and the device that are provided in the embodiments of the present disclosure, a low-delay resource request is implemented and then low-delay data transmission of the UE is ensured, so as to improve user experience.

BRIEF DESCRIPTION OF DRAWINGS

To describe the technical solutions in the embodiments of the present disclosure or in the prior art more clearly, the following briefly describes the accompanying drawings required for describing the embodiments or the prior art.

Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
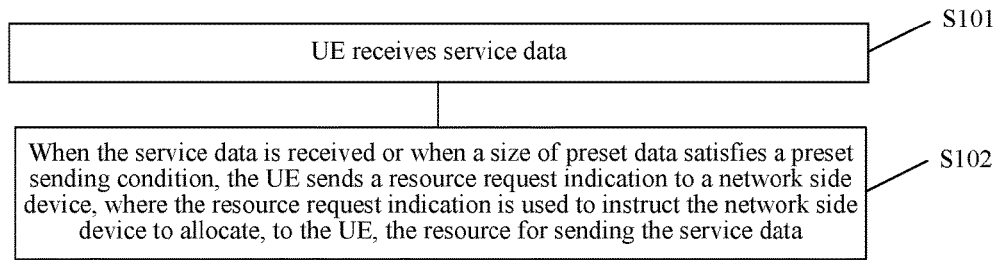
FIG. 1 is a schematic flowchart of a resource request method according to an embodiment of the present disclosure.

Embodiment 1 of the present disclosure provides a resource request method, applied to UE. Referring to FIG. 1, the method may include the following steps.

S101: The UE receives service data.

An access layer of the UE receives the service data, and the service data is delivered by a transport layer of the UE to the access layer.

For example, the service data may be submitted by an Internet Protocol (IP) layer to the access layer.

Optionally, the access layer may be a Packet Data Convergence Protocol (PDCP) layer or a Radio Link Control (RLC) layer.

It should be noted that, a type of the service data is not specifically limited in the present disclosure.

S102: When the service data is received or when a size of preset data satisfies a preset sending condition, the UE sends a resource request indication to a network side device, where the resource request indication is used to instruct the network side device to allocate, to the UE, the resource for sending the service data.

The preset data is the received service data, to-be-transmitted data in a buffer corresponding to a logical channel on which the received service data is located, or all to-be-transmitted data in a buffer of the UE after the service data is received.

The network side device may be a base station, or the network side device may be another device that allocates, to the UE, a resource used to perform the foregoing data transmission, and a type of the network side device is not specifically limited in the present disclosure.

Optionally, the resource request indication may be a BSR, the BSR includes an indication of the size of the preset data, and when receiving the BSR, the network side device may allocate, to the UE according to the BSR, the resource for sending the service data.

It should be noted that, the indication of the size of the preset data may be a value of the size of the preset data, or may be a defined indicator. This is not specifically limited in this embodiment of the present disclosure.

Preferably, to save resources, the indication of the size of the preset data is a defined indicator. Specific content of the indicator may be set according to an actual requirement. This is not specifically limited in this embodiment of the present disclosure.

Optionally, the resource request indication may be other content.

For example, the resource request indication may be an indication of a buffer level, and the buffer level is a preset range of the size of the preset data.

It should be noted that, the indication of the buffer level may be the buffer level itself, or may be a defined indication identifier. This is not specifically limited in this embodiment of the present disclosure.

Preferably, to save resources, the indication of the buffer level is a defined indication identifier. Specific content of the indication identifier may be set according to an actual requirement. This is not specifically limited in this embodiment of the present disclosure.

A valid range of the size of the preset data may be divided into at least two preset ranges in advance by using at least one threshold.

It should be noted that, both a value of and a quantity of the at least one threshold may be set according to an actual requirement. This is not specifically limited in this embodiment of the present disclosure.

For example, assuming that the valid range of the preset data is from 0 megabytes (MB) to 800 MB and two thresholds are respectively set to 300 MB and 500 MB, the valid range may be divided into preset ranges shown in Table 1.

TABLE 1

| Size | Buffer level |
| --- | --- |
| ≤300 MB | low |
| ≤500 MB and >300 MB | intermediate |
| ≤800 MB and >500 MB | high |

It should be noted that, both the foregoing example and Table 1 are specific descriptions about that the resource request indication may be the buffer level by means of example, and the foregoing example or Table 1 is not a specific limitation to the resource request indication, and is not a specific limitation to a division manner and content of the buffer level either.

It should be noted that, the resource request indication may include content other than the foregoing content (e.g., the BSR or the buffer level). Any solution in which UE sends a resource request indication to request a network side device to allocate a resource to the UE falls within the protection range of the present disclosure.

Optionally, the preset sending condition may be that the size of the preset data reaches a preset threshold.

For example, the preset sending condition may be set to that the size of the preset data reaches more than 300 MB. In this way, when the size of the preset data is greater than or equal to 300 MB, the size of the preset data reaches the preset threshold.

It should be noted that, a specific value of the preset threshold may be set according to an actual requirement. This is not specifically limited in the present disclosure.

Optionally, the preset sending condition may be that the buffer level reaches a preset level.

It should be noted that, specific content of the preset level may be set according to an actual requirement. This is not specifically limited in the present disclosure.

For example, the preset sending condition may be set to that the buffer level of the size of the preset data reaches at least "intermediate". In this way, when the size of the preset data is greater than 300 MB and less than or equal to 500 MB, the buffer level of the size of the preset data is "intermediate" according to level division shown in Table 1, and therefore the buffer level of the size of the preset data reaches the preset level.

For example, it is assumed that a size of service data 1 received by the UE in S101 is 350 MB, and the preset sending condition is that the size of the received data reaches more than 300 MB. Therefore, when the service data 1 is received, a resource request indication may be sent to the network side device, and the resource request indication includes an indication of the size of the received service data 1.

It should be noted that, the foregoing example describes the solution only by means of example, but does not specifically limit the solution of this embodiment of the present disclosure.

Further optionally, the preset threshold or the preset level may be preset and is commonly known by devices in a network.

Further optionally, the preset threshold or the preset level may be delivered by the network side device to the UE, and after S101, the method may further include:

receiving the preset threshold or the preset level sent by the network side device.

Optionally, a specific process in which the UE sends the resource request indication to the network side device may include but is not limited to the following three solutions:

First Solution:

an SR including the resource request indication is sent to the network side device.

The SR is sent by using a dedicated time frequency resource.

Second Solution:

the resource request indication is sent to the network side device by using a dedicated time frequency resource on a PUCCH.

Third Solution:

a MAC packet header including the resource request is sent to the network side device.

It should be noted that, a specific sending manner of the resource request indication may be set according to an actual requirement. This is not specifically limited in the present disclosure.

According to the resource request method provided in this embodiment of the present disclosure, the UE receives the service data, and when the service data is received or when the size of the preset data satisfies the preset sending condition, the UE sends the resource request indication to the network side device, where the resource request indication is used to instruct the network side device to allocate, to the UE, the resource for sending the service data.

On one hand, when receiving the service data, the UE requests a resource from the network side device by sending the resource request indication. Therefore, according to the solution of this embodiment of the present disclosure, the resource for sending the service data is requested in time, thereby reducing a delay.

On the other hand, when the size of the preset data satisfies the preset sending condition, a resource is requested from the network side device by sending the resource request indication, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the resource request method provided in this embodiment of the present disclosure, a low-delay resource request is implemented and then low-delay data transmission of the UE is ensured, so as to improve user experience.

Embodiment 2

Figure 2:
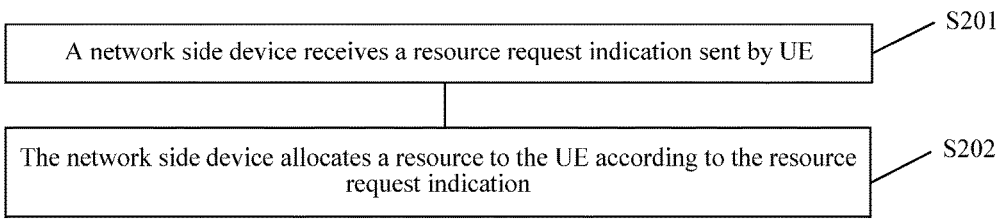
FIG. 2 is a schematic flowchart of another resource request method according to an embodiment of the present disclosure.

Embodiment 2 of the present disclosure provides another resource request method, applied to a network side device. Referring to FIG. 2, the method may include the following steps.

S201: The network side device receives a resource request indication sent by UE.

The resource request indication is sent by the UE when the UE receives service data or sent by the UE when preset data satisfies a preset sending condition.

The preset data may be the received service data, the preset data may be to-be-transmitted data in a buffer corresponding to a logical channel on which the received service data is located, or the preset data may be all to-be-transmitted data in a buffer of the UE after the service data is received.

The network side device may be a base station, or may be another device that allocates, to the UE, a resource used to perform the foregoing data transmission, and a type of the network side device is not specifically limited in the present disclosure.

Optionally, the resource request indication may be a BSR, where the BSR includes an indication of the size of the preset data.

Optionally, the resource request indication may be an indication of a buffer level, and the buffer level is a preset range of the size of the preset data.

It should be noted that, the buffer level is described in detail in Embodiment 1, and details are not described herein again.

Optionally, the preset sending condition may be that the size of the preset data reaches a preset threshold, or the preset sending condition may be that the buffer level reaches a preset level, where the buffer level is a preset range of the size of the preset data.

It should be noted that, the preset sending condition is described in detail in Embodiment 1, and details are not described herein again.

Further optionally, the preset threshold or the preset level may be preset and is commonly known by devices in a network.

Further optionally, the preset threshold or the preset level may be delivered by the network side device to the UE, and before S201, the method may further include:

sending the preset threshold or the preset level to the UE.

Specifically, according to different manners in which the UE sends the resource request indication, a specific process in which the network side device receives the resource request indication sent by the UE may include but is not limited to the following three manners:

First Manner:

an SR that includes the resource request indication and that is sent by the UE is received.

Second Manner:

the resource request indication sent by the UE is received by using a dedicated time frequency resource on a PUCCH.

Third Manner:

an uplink MAC packet header that includes the resource request indication and that is sent by the UE is received.

S202: The network side device allocates a resource to the UE according to the resource request indication.

Optionally, the network side device may obtain, according to the resource request indication, a quantity of resources requested by the UE, and then allocate a resource to the UE according to the quantity of the resources requested by the UE.

Specifically, the network side device may obtain, according to the resource request indication, the quantity of the resources requested by the UE, and the quantity differs as content of the resource request indication differs. This may specifically include the following two cases:

First Case:

in the first case, the resource request indication is a BSR, where the BSR includes an indication of the size of the preset data.

In the first case, the network side device may obtain, according to the resource request indication, a resource quantity corresponding to the size of the preset data included in the BSR as the quantity of the resources requested by the UE.

In a system in which the UE and the network side device are located, a correspondence between a data size and a resource quantity is preset.

It should be noted that, neither content nor a specific form of the preset correspondence between a data size and a resource quantity is limited in the present disclosure.

Second Case:

in the second case, the resource request indication includes the indication of the buffer level.

Further, the network side device may obtain a quantity of requested resources corresponding to buffer levels from a preset correspondence, where the preset correspondence includes at least one buffer level and a quantity of resources in a one-to-one correspondence with the at least one buffer level.

For example, referring to Table 2, a preset correspondence is shown.

TABLE 2

| Buffer level | Resource quantity (piece) |
|---|---|
| low | 200 |
| intermediate | 150 |
| high | 100 |

It should be noted that, Table 2 describes the preset correspondence only by using an example, but does not limit a form or content of the preset correspondence.

Specifically, when allocating a resource to the UE according to the quantity of the resources requested by the UE, the network side device may allocate a resource to the UE only according to the quantity of the resources requested by the UE, and a specific process is not specifically limited in the present disclosure.

Optionally, when allocating a resource to the UE according to the quantity of the resources requested by the UE, the network side device may allocate a resource to the UE with reference to the quantity of the resources requested by the UE and network load, and a specific process is not specifically limited in the present disclosure.

The network load may be a network available capacity. The network side device obtains the network available capacity, and may obtain the network available capacity by interacting with an upper-level network side device.

The upper-level network side device is a network side device closer to a core network than the foregoing network side device when the UE communicates in a network. A type of the upper-level network side device is not specifically limited in this embodiment of the present disclosure.

Specifically, when the network is idle, the network available capacity is large, and when the network is congested, the network available capacity is small or zero.

According to the resource request method provided in this embodiment of the present disclosure, the network side device receives the resource request indication sent by the UE, where the resource request indication is sent by the UE when the UE receives the service data or sent by the UE when the preset data satisfies the preset sending condition; and allocates a resource to the UE according to the resource request indication.

On one hand, the resource request indication is sent by the UE when the UE receives the service data. Therefore, according to the solution of this embodiment of the present disclosure, the resource for sending the service data is requested in time, thereby reducing a delay.

On the other hand, the resource request indication is sent by the UE when the size of the preset data satisfies the preset sending condition, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the resource request method provided in this embodiment of the present disclosure, a low-delay resource request is implemented and then low-delay data transmission of the UE is ensured, so as to improve user experience.

Embodiment 3

Embodiment 3 of the present disclosure provides still another resource request method. By using a process of interaction between UE and a base station as an example, the resource request method described in the foregoing embodiment is described in detail.

Figure 3:
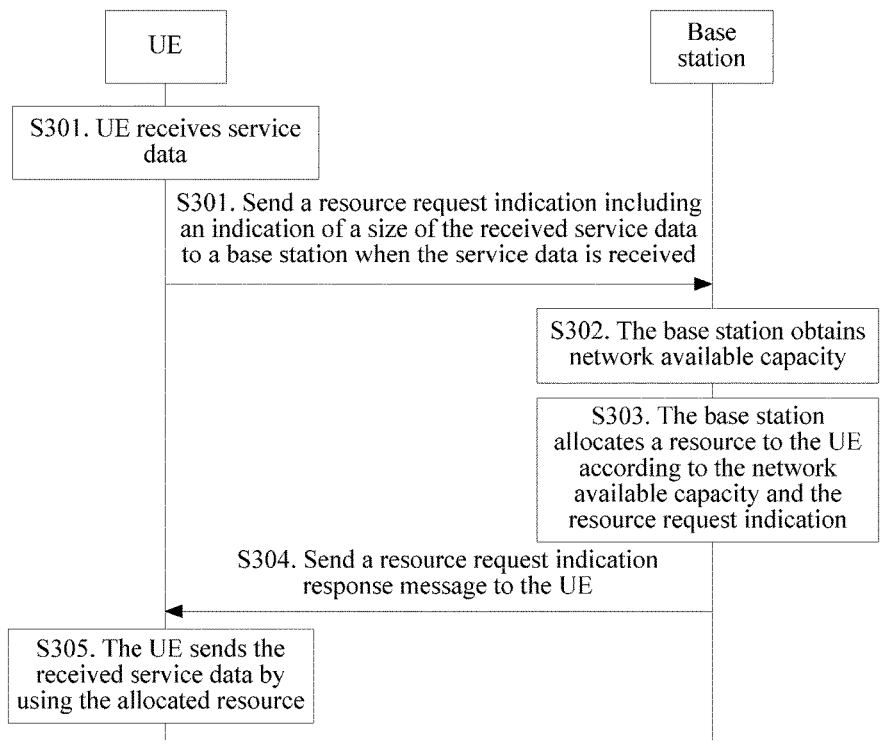
FIG. 3 is a schematic flowchart of still another resource request method according to an embodiment of the present disclosure.

Referring to FIG. 3, the method may include the following steps.

S301: The UE receives the service data, and sends a resource request indication including an indication of a size of the received service data to the base station when the service data is received.

S302: The base station obtains network available capacity.

For example, the base station may send a load request to a core network device, so as to obtain the network available capacity.

S303: The base station allocates a resource to the UE according to the network available capacity and the resource request indication.

Specifically, the base station may allocate a resource to the UE according to one of the network available capacity or the resource request indication that has fewer resources.

S304: The base station sends a resource request indication response message to the UE.

The resource request indication response message includes the resource allocated by the base station to the UE.

S305: The UE sends the received service data by using the allocated resource.

According to the resource request method provided in this embodiment of the present disclosure, the UE receives the service data, and when the service data is received or when the size of the preset data satisfies the preset sending condition, the UE sends the resource request indication to the network side device, where the resource request indication is used to instruct the network side device to allocate, to the UE, the resource for sending the service data.

On one hand, when receiving the service data, the UE requests a resource from the network side device by sending the resource request indication. Therefore, according to the solution of this embodiment of the present disclosure, the resource for sending the service data is requested in time, thereby reducing a delay.

On the other hand, when the size of the preset data satisfies the preset sending condition, a resource is requested from the network side device by sending the resource request indication, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the resource request method provided in this embodiment of the present disclosure, a low-delay resource request is implemented and then low-delay data transmission of the UE is ensured, so as to improve user experience.

Embodiment 4

Figure 4:
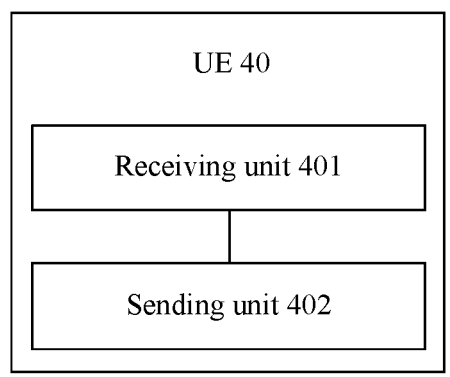
FIG. 4 is a schematic diagram of an apparatus structure of UE according to an embodiment of the present disclosure.

Embodiment 4 of the present disclosure provides UE 40. Referring to FIG. 4, the UE 40 may include:

a receiving unit 401, configured to receive service data; and a sending unit 402, configured to: when the service data is received or when a size of preset data satisfies a preset sending condition, send a resource request indication to a network side device, where the resource request indication is used to instruct the network side device to allocate, to the UE, a resource for sending the service data, where the preset data is the received service data, to-be-transmitted data in a buffer corresponding to a logical channel on which the received service data is located, or all to-be-transmitted data in a buffer of the UE after the service data is received.

Optionally, the resource request indication may be a BSR, where the BSR includes an indication of the size of the preset data.

Optionally, the resource request indication may be an indication of a buffer level, and the buffer level is a preset range of the size of the preset data.

Further, the sending unit 402 may be configured to:

send an SR including the resource request indication to the network side device;

send the resource request indication to the network side device by using a dedicated time frequency resource on a PUCCH; or send an uplink MAC packet header including the resource request to the network side device.

Optionally, the preset sending condition is that the size of the preset data reaches a preset threshold, or the preset sending condition is that the buffer level reaches a preset level, where the buffer level is a preset range of the size of the preset data.

Further, the receiving unit 401 may be further configured to:

receive the preset threshold or the preset level sent by the network side device.

The UE 40 provided in this embodiment of the present disclosure receives the service data, and when the service data is received or when the size of the preset data satisfies the preset sending condition, the UE sends the resource request indication to the network side device, where the resource request indication is used to instruct the network side device to allocate, to the UE, the resource for sending the received service data.

On one hand, when receiving the service data, the UE requests a resource from the network side device by sending the resource request indication. Therefore, according to the solution of this embodiment of the present disclosure, the resource for sending the service data is requested in time, thereby reducing a delay.

On the other hand, when the size of the preset data satisfies the preset sending condition, a resource is requested from the network side device by sending the resource request indication, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the UE 40 provided in this embodiment of the present disclosure, a low-delay resource request is implemented and then low-delay data transmission of the UE is ensured, so as to improve user experience.

Embodiment 5

Figure 5:
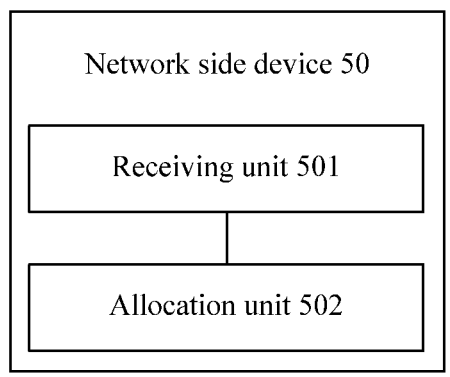
FIG. 5 is a schematic diagram of an apparatus structure of a network side device according to an embodiment of the present disclosure.

Embodiment 5 of the present disclosure provides a network side device 50. Referring to FIG. 5, the network side device 50 may include:

a receiving unit 501, configured to receive a resource request indication sent by UE, where the resource request indication is sent by the UE when the UE receives service data or sent by the UE when preset data satisfies a preset sending condition; and the preset data is the received service data, to-be-transmitted data in a buffer corresponding to a logical channel on which the received service data is located, or all to-be-transmitted data in a buffer of the UE after the service data is received; and an allocation unit 502, configured to allocate a resource to the UE according to the resource request indication received by the receiving unit 501.

Optionally, the resource request indication may be a BSR, where the BSR includes an indication of the size of the preset data.

Optionally, the resource request indication may be an indication of a buffer level, and the buffer level is a preset range of the size of the preset data.

Further, the receiving unit 501 may be configured to:

receive an SR that includes the resource request indication and that is sent by the UE;

receive, by using a dedicated time frequency resource on a PUCCH, the resource request indication sent by the UE; or receive an uplink MAC packet header that includes the resource request indication and that is sent by the UE.

Optionally, the preset sending condition may be that the size of the preset data reaches a preset threshold, or the preset sending condition may be that the buffer level reaches a preset level, where the buffer level is a preset range of the size of the preset data.

Figure 6:
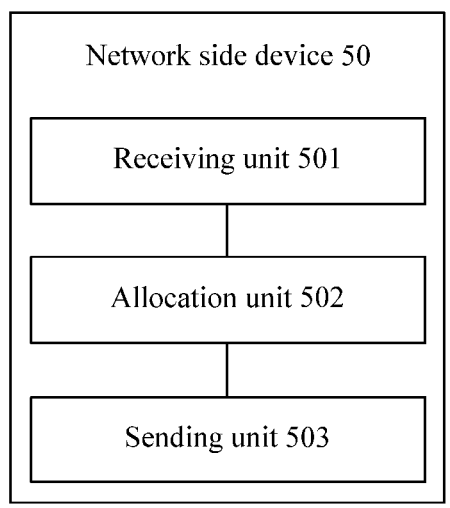
FIG. 6 is a schematic diagram of an apparatus structure of another network side device according to an embodiment of the present disclosure.

Further, referring to FIG. 6, the network side device 50 may further include:

a sending unit 503, configured to send the preset threshold or the preset level to the UE.

The network side device 50 provided in this embodiment of the present disclosure receives the resource request indication sent by the UE, where the resource request indication is sent by the UE when the UE receives the service data or sent by the UE when the preset data satisfies the preset sending condition; and allocates a resource to the UE according to the resource request indication.

On one hand, the resource request indication is sent by the UE when the UE receives the service data. Therefore, according to the solution of this embodiment of the present disclosure, the resource for sending the service data is requested in time, thereby reducing a delay.

On the other hand, the resource request indication is sent by the UE when the size of the preset data satisfies the preset sending condition, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the network side device 50 provided in this embodiment of the present disclosure, a low-delay resource request is implemented and then low-delay data transmission of the UE is ensured, so as to improve user experience.

Embodiment 6

Figure 7:
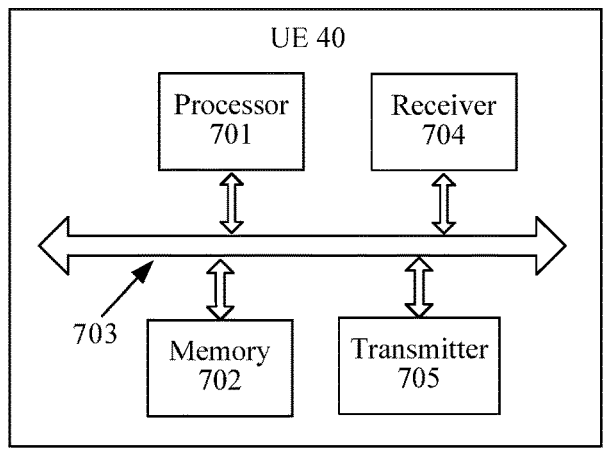
FIG. 7 is a schematic diagram of an apparatus structure of another UE according to an embodiment of the present disclosure.

Embodiment 6 of the present disclosure provides another UE 40. Referring to FIG. 7, the UE 40 may include:

at least one processor 701; a memory 702; at least one communications bus 703, configured to implement connection and mutual communication between apparatuses; a receiver 704; and a transmitter 705.

The communications bus 703 may be an industry standard architecture (ISA) bus, a peripheral component interconnect (PCI) bus, an extended industry standard architecture (EISA) bus, or the like. The bus 703 may be classified into an address bus, a data bus, a control bus, and the like. For convenience of representation, only one bold line is used for representation in FIG. 7, but it does not represent that there is only one bus or one type of bus.

The processor 701 may be a central processing unit (CPU), an application-specific integrated circuit (ASIC), or one or more integrated circuits configured to implement this embodiment of the present disclosure. The processor 701 is configured to execute program code stored in the memory 702, so as to implement a function of the processor 701.

The receiver 704 is configured to receive service data.

The processor 701 is configured to: when the service data is received or when a size of preset data satisfies a preset sending condition, send a resource request indication to a network side device by using the transmitter 705, where the resource request indication is used to instruct the network side device to allocate, to the UE, a resource for sending the service data.

The preset data is the received service data, to-be-transmitted data in a buffer corresponding to a logical channel on which the received service data is located, or all to-be-transmitted data in a buffer of the UE after the service data is received.

Optionally, the resource request indication may be a BSR, where the BSR includes an indication of the size of the preset data.

Optionally, the resource request indication may be an indication of a buffer level, and the buffer level is a preset range of the size of the preset data.

Optionally, the processor 701 may be configured to:

send an SR including the resource request indication to the network side device by using the transmitter 705;

send the resource request indication to the network side device by using a dedicated time frequency resource on a PUCCH and by using the transmitter 705; or send an uplink MAC packet header including the resource request to the network side device by using the transmitter 705.

Optionally, the preset sending condition may be that the size of the preset data reaches a preset threshold, or the preset sending condition may be that the buffer level reaches a preset level, where the buffer level is a preset range of the size of the preset data.

Further, the receiver 704 may be further configured to:
receive the preset threshold or the preset level sent by the network side device.

The UE 40 provided in this embodiment of the present disclosure receives the service data, and when the service data is received or when the size of the preset data satisfies the preset sending condition, the UE sends the resource request indication to the network side device, where the resource request indication is used to instruct the network side device to allocate, to the UE, the resource for sending the received service data.

On one hand, when receiving the service data, the UE requests a resource from the network side device by sending the resource request indication. Therefore, according to the solution of this embodiment of the present disclosure, the resource for sending the service data is requested in time, thereby reducing a delay.

On the other hand, when the size of the preset data satisfies the preset sending condition, a resource is requested from the network side device by sending the resource request indication, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the UE 40 provided in this embodiment of the present disclosure, a low-delay resource request is implemented and then low-delay data transmission of the UE is ensured, so as to improve user experience.

Embodiment 7

Figure 8:
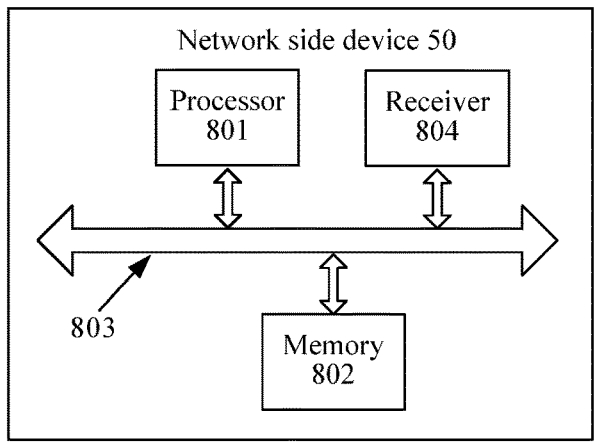
FIG. 8 is a schematic diagram of an apparatus structure of still another network side device according to an embodiment of the present disclosure.

Embodiment 7 of the present disclosure provides another network side device 50. Referring to FIG. 8, the network side device 50 may include:
at least one processor 801; a memory 802; at least one communications bus 803, configured to implement connection and mutual communication between apparatuses; and a receiver 804.

The communications bus 803 may be an industry standard architecture (ISA) bus, a peripheral component interconnect (PCI) bus, an extended industry standard architecture (EISA) bus, or the like. The bus 803 may be classified into an address bus, a data bus, a control bus, and the like. For convenience of representation, only one bold line is used for representation in FIG. 8, but it does not represent that there is only one bus or one type of bus.

The processor 801 may be a central processing unit (CPU), an application-specific integrated circuit (ASIC), or one or more integrated circuits configured to implement this embodiment of the present disclosure. The processor 801 is configured to execute program code stored in the memory 802, so as to implement a function of the processor 801.

The receiver 804 is configured to receive a resource request indication sent by UE, where the resource request indication is sent by the UE when the UE receives service data or sent by the UE when preset data satisfies a preset sending condition; and the preset data is the received service data, to-be-transmitted data in a buffer corresponding to a logical channel on which the received service data is located, or all to-be-transmitted data in a buffer of the UE after the service data is received; and The processor 801 is configured to allocate a resource to the UE according to the resource request indication received by the receiver 804.

Optionally, the resource request indication may be a BSR, where the BSR includes an indication of the size of the preset data.

Optionally, the resource request indication is an indication of a buffer level, and the buffer level is a preset range of the size of the preset data.

Further, the receiver 804 may be configured to:
receive an SR that includes the resource request indication and that is sent by the UE;
receive, by using a dedicated time frequency resource on a PUCCH, the resource request indication sent by the UE; or
receive an uplink MAC packet header that includes the resource request indication and that is sent by the UE.

Optionally, the preset sending condition may be that the size of the preset data reaches a preset threshold, or the preset sending condition may be that the buffer level reaches a preset level, where the buffer level is a preset range of the size of the preset data.

Figure 9:
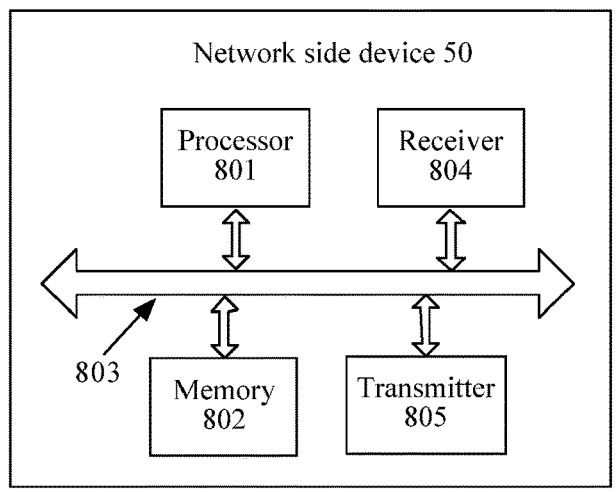
FIG. 9 is a schematic diagram of an apparatus structure of yet another network side device according to an embodiment of the present disclosure.

Further, referring to FIG. 9, the network side device 50 may further include:
a transmitter 805, configured to send the preset threshold or the preset level to the UE.

The network side device 50 provided in this embodiment of the present disclosure receives the resource request indication sent by the UE, where the resource request indication is sent by the UE when the UE receives the service data or sent by the UE when the preset data satisfies the preset sending condition; and allocates a resource to the UE according to the resource request indication.

On one hand, the resource request indication is sent by the UE when the UE receives the service data. Therefore, according to the solution of this embodiment of the present disclosure, the resource for sending the service data is requested in time, thereby reducing a delay.

On the other hand, the resource request indication is sent by the UE when the size of the preset data satisfies the preset sending condition, a resource request delay may be controlled by setting content of the preset sending condition, and the resource request indication is sent by using the dedicated time frequency resource on the PUCCH and by using the SR or a quasi SR without pre-allocating a resource used for the resource request indication, thereby reducing the delay. Therefore, according to the solution of this embodiment of the present disclosure, a time of requesting the resource for sending the service data may be controlled, and then the delay is reduced.

To sum up, according to the network side device 50 provided in this embodiment of the present disclosure, a low-delay resource request is implemented and then low-delay data transmission of the UE is ensured, so as to improve user experience.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from a scope of the technical solutions of the embodiments of the present disclosure.

What is claimed is:

1. A resource request method, applied to user equipment (UE), wherein the method comprises:
    receiving service data; and
    when the service data is received or when a size of preset data to be transmitted to a network side device satisfies a preset sending condition, sending a resource request indication to the network side device, wherein the resource request indication is used to instruct the network side device to allocate, to the UE, a resource for sending the service data to the network side device, wherein a resource request delay in the sending of the resource request indication is controlled based on a setting of the preset sending condition, and wherein
    the preset data is the received service data, to-be-transmitted data in a buffer corresponding to a logical channel on which the received service data is located, or all to-be-transmitted data in a buffer of the UE after the service data is received.

2. The method according to claim 1, wherein
    the resource request indication is a buffer status report (BSR), wherein the BSR comprises an indication of the size of the preset data.

3. The method according to claim 1, wherein
    the resource request indication is an indication of a buffer level, and the buffer level is a preset range of the size of the preset data.

4. The method according to claim 1, wherein the sending a resource request indication to a network side device comprises:
    sending a scheduling request (SR) comprising the resource request indication to the network side device;
    sending the resource request indication to the network side device by using a dedicated time frequency resource on a physical uplink control channel (PUCCH); or
    sending an uplink media access control (MAC) packet header comprising the resource request indication to the network side device.

5. The method according to claim 1, wherein
    the preset sending condition comprises the size of the preset data reaching a preset threshold; or
    the preset sending condition comprises the buffer level reaching a preset level, wherein the buffer level is a preset range of the size of the preset data.

6. The method according to claim 5, wherein after the receiving service data, the method further comprises:
    receiving the preset threshold or the preset level as the preset sending condition sent by the network side device to control a length of the resource request delay.

7. User equipment (UE), comprising:
    a receiver, configured to receive service data; and
    a transmitter, configured to: when the service data is received or when a size of preset data to be transmitted to a network side device satisfies a preset sending condition, send a resource request indication to a network side device, wherein the resource request indication is used to instruct the network side device to allocate, to the UE, a resource for sending the service data to the network side device, wherein a resource request delay in the sending of the resource request indication is controlled based on a setting of the preset sending condition, and wherein
    the preset data is the received service data, to-be-transmitted data in a buffer corresponding to a logical channel on which the received service data is located, or all to-be-transmitted data in a buffer of the UE after the service data is received.

8. The UE according to claim 7, wherein
    the resource request indication is a buffer status report (BSR), wherein the BSR comprises an indication of the size of the preset data.

9. The UE according to claim 7, wherein
    the resource request indication is an indication of a buffer level, and the buffer level is a preset range of the size of the preset data.

10. The UE according to claim 7, wherein the transmitter is configured to:

send a scheduling request (SR) comprising the resource request indication to the network side device;

send the resource request indication to the network side device by using a dedicated time frequency resource on a physical uplink control channel (PUCCH); or send an uplink media access control (MAC) packet header comprising the resource request to the network side device.

11. The UE according to claim 7, wherein the preset sending condition comprises the size of the preset data reaching a preset threshold; or the preset sending condition comprises the buffer level reaching a preset level, wherein the buffer level is a preset range of the size of the preset data.

12. The UE according to claim 11, wherein the receiver is further configured to:

receive the preset threshold or the preset level as the preset sending condition sent by the network side device to control a length of the resource request delay.

13. A network side device, comprising:

a receiver, configured to receive a resource request indication sent by user equipment (UE), wherein the resource request indication is sent by the UE when the UE receives service data or sent by the UE when preset data satisfies a preset sending condition, wherein a resource request delay in the sending of the resource request indication by the UE to the network side device is controlled based on a setting of the preset sending condition; and the preset data is the received service data, to-be-transmitted data in a buffer corresponding to a logical channel on which the received service data is located, or all to-be-transmitted data in a buffer of the UE after the service data is received; and a processor, configured to allocate a resource to the UE according to the resource request indication.

14. The network side device according to claim 13, wherein the resource request indication is a buffer status report (BSR), wherein the BSR comprises an indication of the size of the preset data.

15. The network side device according to claim 13, wherein the resource request indication is an indication of a buffer level, and the buffer level is a preset range of the size of the preset data.

16. The network side device according to claim 13, wherein the receiver is configured to:

receive a scheduling request (SR) that comprises the resource request indication and that is sent by the UE;

receive, by using a dedicated time frequency resource on a physical uplink control channel (PUCCH), the resource request indication sent by the UE; or receive an uplink media access control (MAC) packet header that comprises the resource request indication and that is sent by the UE.

17. The network side device according to claim 13, wherein the preset sending condition comprises the size of the preset data reaching a preset threshold; or the preset sending condition comprises the buffer level reaching a preset level, wherein the buffer level is a preset range of the size of the preset data.

18. The network side device according to claim 17, wherein the network side device further comprises:

a transmitter, configured to send the preset threshold or the preset level as the preset sending condition to the UE to control a length of the resource request delay.

* * * * *